(12) United States Patent
Anna et al.

(10) Patent No.: US 7,864,478 B2
(45) Date of Patent: Jan. 4, 2011

(54) VERIFICATION OF A TAPE DATA STORAGE CARTRIDGE

(75) Inventors: Gary Anna, Tucson, AZ (US); Norie Iwasaki, Kanagawa (JP); Gregory Tad Kishi, Oro Valley, AZ (US); Duke Andy Lee, Tucson, AZ (US); Koichi Masuda, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 12/196,477

(22) Filed: Aug. 22, 2008

(65) Prior Publication Data
US 2010/0046108 A1 Feb. 25, 2010

(51) Int. Cl.
*G11B 19/02* (2006.01)
(52) U.S. Cl. ........................ 360/69; 360/72.1
(58) Field of Classification Search ............... None
See application file for complete search history.

(56) References Cited

U.S. PATENT DOCUMENTS

| | | | |
|---|---|---|---|
| 5,809,511 A | 9/1998 | Peake | 707/204 |
| 5,852,534 A * | 12/1998 | Ozue et al. | 360/69 |
| 6,084,736 A | 7/2000 | Kurokawa et al. | 360/71 |
| 6,088,182 A | 7/2000 | Taki et al. | 360/71 |
| 6,226,712 B1 | 5/2001 | Carlson et al. | 711/112 |
| 6,336,163 B1 | 1/2002 | Brewer et al. | 711/112 |
| 6,525,894 B1 * | 2/2003 | Nakamura | 360/49 |
| 6,625,703 B2 | 9/2003 | Goodman et al. | 711/162 |

OTHER PUBLICATIONS

Technical Disclosure Bulletin: E.V. Cussick and E.R. Videki II; 'Security for Record-Containing Cassettes'; vol. 24, No. 3, Aug. 1981; pp. 1499-1501.

* cited by examiner

*Primary Examiner*—Andrew L Sniezek

(57) ABSTRACT

The provision of verification for data storage cartridges having data storage tape media employs determining the volume identity of a data storage cartridge; and providing an internal label at each block of data to be written to the data storage tape media of the data storage cartridge, the internal label at least comprising the volume identity. Verification of a label comprises reading an external label of the cartridge, the external label at least comprising a volume identity of the cartridge; determining whether the tape media comprises valid data arranged in blocks; positioning the tape media at one of the data blocks and attempting to read an internal label from the data block; and if so, determining whether the volume identity of the external label matches the volume identity of the internal label, and, if so, determining that the matching volume identity is the volume identity of the cartridge.

6 Claims, 12 Drawing Sheets

VERIFICATION OF A TAPE DATA STORAGE CARTRIDGE

TECHNICAL FIELD

The disclosure relates generally to tape data storage cartridges and more particularly, to verification of the identity of tape data storage cartridges.

BACKGROUND OF THE INVENTION

A virtual tape system is a tape management system such as a special storage device or group of devices and software which manages data such that the data appears to be stored entirely on data storage cartridges when portions of the data may actually be located in faster, hard disk storage. Programming for a virtual tape system is sometimes referred to as virtual tape server (VTS), although these terms may be used interchangeably, unless otherwise specifically indicated. A virtual tape system may be used with hierarchical storage management (HSM) system in which data is moved as the data falls through various usage thresholds to slower but less costly forms of storage media. A virtual tape system may also be used as part of a storage area network (SAN) where less-frequently used or archived data can be managed by a single virtual tape server for a number of networked computers.

Virtual tape storage subsystems, such as International Business Machines (IBM®) Magstar Virtual Tape Server, comprise at least one virtual tape server (VTS) coupled to a tape library comprising numerous tape drives and data storage cartridges. The VTS is also coupled to a direct access storage device (DASD), comprised of numerous interconnected hard disk drives.

The DASD functions as a tape volume cache (TVC) of the VTS subsystem. When using a VTS, the host application writes tape data to virtual drives. The volumes written by the host system are physically stored in the tape volume cache (e.g., a RAID disk buffer) and are called virtual volumes. The storage management software within the VTS copies the virtual volumes in the TVC to the physical cartridges owned by the VTS subsystem. Once a virtual volume is copied or migrated from the TVC to tape, the virtual volume is then called a logical volume. As virtual volumes are copied from the TVC to a Magstar cartridge (tape), they are copied on the cartridge end to end, taking up only the space written by the host application. This arrangement maximizes utilization of a cartridge storage capacity.

The storage management software manages the location of the logical volumes on the physical cartridges, and the customer has no control over the location of the data. When a logical volume is copied from a physical cartridge to the TVC, the process is called recall and the volume becomes a virtual volume again. The host cannot distinguish between physical and virtual volumes, or physical and virtual drives. Thus, the host treats the virtual volumes and virtual drives as actual cartridges and drives and all host interaction with tape data in a VTS subsystem is through virtual volumes and virtual tape drives.

Before data can be copied from the TVC to the cartridge or read from the cartridge back to the TVC, the VTS system must communicate with the physical library to mount the cartridge to a drive. After the cartridge has been mounted, the VTS system does not immediately navigate to the desired tape position and start writing new data or recalling logical volumes. The complexities of modern automated physical libraries with a mixture of tape drives and data storage cartridges can not guarantee the correct cartridge has been mounted to the requested drive. The VTS subsystem is the final line of defense for the protection of customer data. If data is written to the wrong cartridge, this results in not being able to recall logical volumes to the TVC and even overwriting active data. If data is simply read from the desired tape position, it could be the wrong data. The bottom line is that the VTS subsystem must have a method to ensure the mounted cartridge is the correct cartridge (label verification or label check).

Although the VTS subsystem virtualizes the location of the customer data, the VTS must still manage the physical resource layer consisting of a plurality of physical cartridge types and drive types in the attached automated physical library.

All physical cartridges in the library should have an external label (e.g. a bar code label) that is operator readable and/or machine readable. The label identifies the volume serial number (herein referred to as the VOLSER) of the cartridge and is used to identify the cartridge to the physical library. All communication with the control program relating to a specific cartridge uses the volser that is read from the external bar code label. The external bar code label also contains 1 or 2 character(s) to identify the cartridge type (media type).

The VTS subsystem and other host systems have adhered to a simple but a strict rule when writing data to or reading data from a cartridge. The first time a cartridge is inserted into the physical library, the front of the tape must be pre-labeled with a standard label containing a VOL1 record, HDR1 record, HDR2 record, and a tape mark. The VOL1 record contains the equivalent of the external label. This internally written label is herein referred to as the BOT (Beginning of Tape) label. When the cartridge is needed, the VTS subsystem mounts it to a supported drive. The VTS system first rewinds the mounted cartridge to the beginning of the tape. Then it verifies the validity of the mounted physical cartridge by reading the BOT label from the cartridge and comparing the BOT label with the external label of the cartridge it believes is mounted. If the VTS system could not read the BOT label from the cartridge, it would stop using the cartridge. If the BOT label is readable and matches the external label, the VTS system can now write new data to or read data from the mounted cartridge. Every time the cartridge is mounted, the cartridge has to be rewound to perform the label check.

This cartridge label verification method is effective but inefficient and inflexible. It is inefficient because the label verification is always at the beginning of tape, thus the cartridge has to be rewound on every mount. Furthermore, although the algorithms in HSM attempt to group the processing of logical volumes in relational chains, such that all the logical volumes in a particular chain exist on the same physical volume, to optimize the speed at which data is being copied to or recalled from tape, the fact that each mount requires having to re-navigate to the last block written is inefficient. It is inflexible as it is a requirement that new cartridges inserted into the subsystem must be pre-labeled in a data format readable to that subsystem.

SUMMARY OF THE INVENTION

Methods, data storage cartridges, tape subsystems and an article of manufacture provide verification for data storage cartridges having data storage tape media.

In one embodiment, a method comprises determining the volume identity of the data storage cartridge; and providing an internal label at each block of data to be written to the data storage tape media of the data storage cartridge, the internal label at least comprising the volume identity.

In a further embodiment, the method additionally causes data to be written to the data storage tape media of the data storage cartridge; and as the result of completion of writing the data, causes the data storage tape media to be retained at its current position, rather than being rewound to the beginning of tape.

In a still further embodiment, wherein the data storage cartridge comprises an external label identifying a volume identity, the determining step comprises determining whether the volume identity of the external label matches the volume identity of an internal label, and, if so, making the determination that the matching volume identity is the volume identity of the data storage cartridge.

In another embodiment, wherein the data storage cartridge comprises a cartridge memory identifying a volume identity, and comprises an external label identifying a volume identity; the method additionally comprises determining whether the data storage cartridge is a scratch (no relevant data exist) cartridge, and, if so, the identity determining step comprises determining whether the volume identity of the external label matches the volume identity of the cartridge memory, and, if so, making the determination that the matching volume identity is the volume identity of the data storage cartridge. The method causes the volume identity to be written at a beginning of tape of the data storage tape media; and causes the provided internal label to be written at each block of data to the data storage tape media of the data storage cartridge, the internal label at least comprising the volume identity.

In a further embodiment, the providing step comprises providing the internal label at the block header of each the block of data to be written to the data storage tape media of the data storage cartridge.

In another embodiment, the providing step comprises providing the internal label at the block trailer of each the block of data to be written to the data storage tape media of the data storage cartridge.

In still another embodiment, a method for verifying a label of a data storage cartridge having data storage tape media, comprises reading an external label of the data storage cartridge, the external label at least comprising a volume identity of the data storage cartridge; determining whether the data storage tape media comprises valid data arranged in blocks; positioning the data storage tape media at one of the data blocks; attempting to read an internal label from the one of the data blocks; and if so, determining whether the volume identity of the external label matches the volume identity of the internal label, and, if so, making a determination that the matching volume identity is the volume identity of the data storage cartridge.

In a further embodiment, the data block positioning step comprises positioning the data storage tape media to the last block written to the data storage tape media.

In a still further embodiment, the method additionally determines the current position of the data storage tape media; and the data block positioning step comprises positioning the data storage tape media to the block written to the data storage tape media nearest to the current position.

In another embodiment, the method additionally positions the data storage tape media to the last block written to the data storage tape media; and causes an internal label to be written at each block of data written to the data storage tape media of the data storage cartridge subsequent to the last block, the internal label at least comprising the volume identity.

DETAILED DESCRIPTION OF THE PREFERRED EMBODIMENTS

Figure 1:
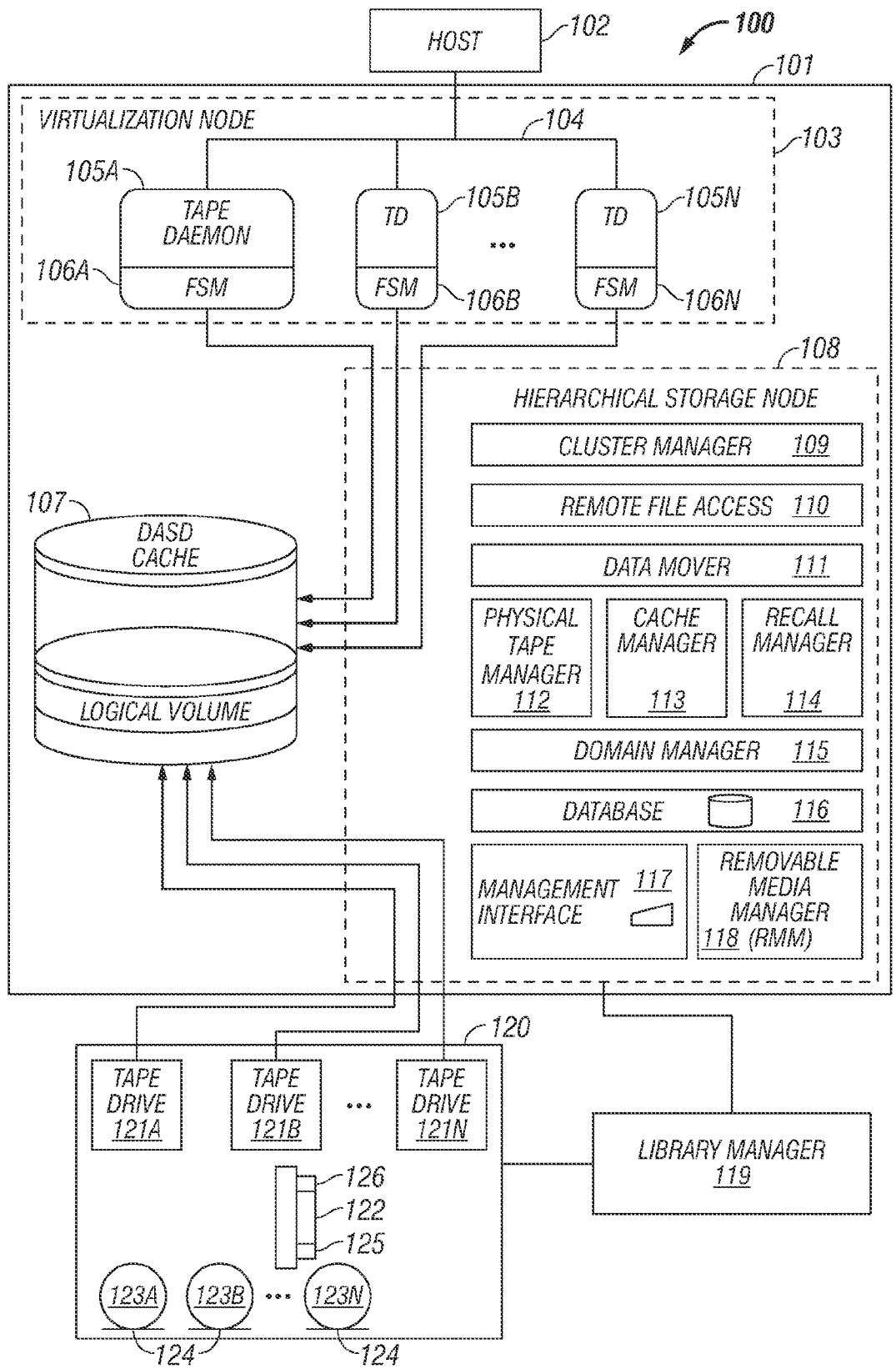
FIG. 1 illustrates a detailed block diagram of a tape network including a tape subsystem and tape library which may implement an embodiment of the present invention.

The following is intended to provide a detailed description of an example of the invention and should not be taken to be limiting of the invention itself. Rather, any number of variations may fall within the scope of the invention which is defined in the claims following the description.

It will be understood that the flowchart illustrations and/or block diagrams described herein can be implemented in whole or in part by dedicated hardware circuits, firmware and/or computer program instructions which are provided to a processor of a general purpose computer, special purpose computer, or other programmable data processing apparatus to produce a machine, such that the instructions (which execute via the processor of the computer or other programmable data processing apparatus) implement the functions/acts specified in the flowchart and/or block or blocks of the block diagram. In addition, while various details are set forth in the following description, it will be appreciated that the present invention may be practiced without these specific details, and that numerous implementation-specific decisions may be made to the invention described herein to achieve the device designer's specific goals, such as compliance with technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. The storage medium may be any writable storage media such as a tape cartridge, optical disk, disk drive, USB storage device, a flash memory, holographic memory, non-volatile magnetic memory such as magnetoresistive random access memory (MRAM), and the like. For example, the storage device may be a tape drive, optical drive, disk drive controller, USB drive controller, a flash drive, or other storage device that is capable of reading and/or writing a writable storage media as described above. For simplicity, the description provided herein is provided with respect to a tape drive and a tape cartridge as the respective storage device and storage medium. One of ordinary skill in the art will recognize that these concepts apply to other storage devices and storage media. The terms "data storage drive" "storage drive", "drive", "tape storage drive", and "tape drive" are herein used interchangeably herein. Further, it is noted that the terms "removable media cartridge", "data storage cartridge", "storage cartridge", "tape cartridge" and "cartridge" are herein used interchangeably herein. Various illustrative embodiments of the present invention will now be described in detail below with reference to the figures.

Although the VTS system virtualizes the location of the customer data, the VTS must still manage the physical resource layer consisting of a plurality of physical cartridge types and drive types in the attached automated physical library.

All physical cartridges in the library should have an external label (e.g. a bar code label) that is operator readable and/or machine readable. The label identifies the volume serial number (herein referred to as the VOLSER) of the cartridge and is used to identify the cartridge to the physical library. All communication with the control program relating to a specific cartridge uses the volser that is read from the external bar code label. The external bar code label also typically contains 1 or 2 character(s) to identify the cartridge type (media type).

The volser ranges are used to determine a volser media type when it is inserted into the library. When a range is added or modified, the system automatically combines overlapping ranges with the same cartridge type and checks for range conflicts.

When a volser range changes, the cartridge types for existing volumes in the library do not change. Volumes that are inserted subsequently reflect the new set of ranges and associated cartridge types.

Each physical drive type in the library has its own supported cartridge types and data formats. The IBM® TotalStorage 3592 Tape Drive Model J1A (3592 J1A tape drive) can use cartridge types of JJ, JR, JA, and JW and can write new data from beginning of tape or append data to these cartridges in the J1A data format. The 3592 J1A drive can only read cartridges written in the J1A data format. The IBM® TotalStorage 3592 Tape Drive Model E05 without the encryption module (3592 E05 tape drive) can use media types of JJ, JR, JA, JW, JB, and JX and can write new data from beginning of tape or append data to these cartridges in both J1A and E05 data formats. The 3592 E05 tape drive can read cartridges written in the J1A and E05 data formats. The IBM® TotalStorage 3592 Tape Drive Model E05 with the encryption module (3592 E05E tape drive) can use media types of JJ, JR, JA, JW, JB, and JX and can write new data from beginning of tape or append to these cartridges in J1A, E05, and E05 encrypted (E05E) data formats. It is important to note that even though a drive can dynamically write data in various formats, the data format can only change when the cartridge is written at the beginning of tape. In other words, appending data to an existing cartridge in a different data format is restricted by the drive.

Each physical library attached to the VTS subsystem may have its own communication protocols, features, and functionalities. The VTS subsystem supports attachment to multiple library types. The VTS subsystem communicates with the IBM® System Storage TS3500 Tape Library (TS3500 tape library) through the paths provided by the physical drives, shown in FIG. 1. When the VTS subsystem is attached to an IBM® TotalStorage Enterprise Tape Library 3494 (3494 tape library), the communication is done through an Ethernet network. In the 3494 tape library, the VTS subsystem can correlate the location of a cartridge or drive with a cell address identifying the physical location (frame, row, and column). In the TS3500 tape library, all physical cell locations are virtualized to the attached subsystem, and thus the VTS subsystem can only reference the location of a physical cartridge or drive by an element address. In terms of functionalities, the behavior of a particular function varies with the physical library type. For example, when 3494 tape library receives an audit command from the VTS system, the 3494 vision system scans the external label and compares it with the VOLSER in the database. In the TS3500 tape library, an audit command is equivalent to the "Initialize Element with Range" command, which verifies the VOLSER is in the library's inventory without moving the vision system to scan the external label. These are only a few examples of the differences in physical library types that affect the how the VTS subsystem must interact to manage data to and from tape.

With reference now to the drawings, and in particular to FIG. 1, there is illustrated a block diagram of a tape management system. Virtual storage system 100 includes a virtual tape server (VTS) 101, a tape library 120, and a library manager 119. A host system 102 is linked to the virtual tape server 101 via a network connection, e.g. TCP/IP, LAN, Ethernet, and the IBM® Enterprise System Connection (ESCON) (not shown). In one embodiment, host system 102 is a computer, such as a personal computer, workstation or mainframe that is linked to the virtual tape server 101 via an ESCON channel. Virtual tape server 101, in one embodiment, is a computer including a processor, such as a personal computer, workstation or mainframe and is associated with a Direct Access Storage Device (DASD) cache 107. The DASD cache 107 preferably includes one or more logical volumes. In one embodiment, DASD cache 107 includes a plurality of hard disks that are spaced into redundant array of inexpensive disk (RAID) arrays.

While the tape management system is referred to herein as a Virtual Tape System (VTS), a VTS is only one example of a tape management system. As would be understood by one of ordinary skill in the art the present disclosure applies to any tape management system, such as a tape library and virtual tape software etc. Further, it should be noted that while only one virtual storage system 100 is shown in FIG. 1, more than one virtual storage system (e.g. a multi-cluster tape management system, wherein each cluster is connected to its own physical library) may be provided in the present disclosure. The virtual storage systems 100, while not shown, may be connected such that information stored in one virtual storage system may be accessible by other virtual storage systems via remote file access servers 110. Information about the virtual storage systems 100 in a domain may be stored by domain manager 115. A set of interconnected clusters is called a domain (not shown).

Tape library 120 includes a plurality of tape drives 121, generally designated tape drives 121A, 121B ... 121N, such as International Business Machines (IBM®), TS1100 or Jaguar 3592 tape drives or any other tape drive known in the art. Generally, a removable storage volume, e.g., a data storage cartridge 123A, 123B, ... 123N, is loaded into each of the tape drives. Tape drives 121 are serviced by an accessor (e.g., a robot) 122 which transfers selected data storage cartridges 123A, 123B, . . . 123N between tape drives 121 and their corresponding storage shelves 124 within a data storage cartridge repository.

It will be noted that the variable identifier "N" is used in several instances in FIG. 1 to more simply designate the final element (e.g., tape drives, 121A, 121B . . . 121N, and data storage cartridges, 123A, 123B, . . . 123N) of a series of related or similar elements (e.g., tape drives and data storage cartridges). The repeated use of such variable identifiers is not meant to imply a correlation between the sizes of such series of elements, although such correlation may exist. The use of such variable identifiers does not require that the series of elements has the same number of elements as another series delimited by the same variable identifier. Rather, in each instance of use, the variable identified by "N" may hold the same or a different value than other instances of the same variable identifier.

Tape library 120 typically includes storage management software utilized to monitor the active space on the data storage cartridges and schedule reclamations of data storage cartridges when the system is less active. In one embodiment, tape library 120 is a tape library system such as the IBM® Virtualization Engine TS 7740 and IBM® Magstar 3494 Tape Library. Library manager 119 is utilized in virtual storage system 100 to install, maintain, configure, and operate tape library 120. Within automated library 120, accessor 122 may be controlled utilizing a library manager 119 based upon inputs received from removable media manager 118.

The accessor 122 incorporates a vision system 125 such as a bar code reader to read the external labels of the data storage cartridges.

The library manager 119 directs the accessor 122 to specific storage shelves and may employ the vision system 125 to read the external labels to insure that the desired cartridges are being accessed. Alternatively, an inventory may be generated or verified by the library manager by moving the vision system to scan all cartridges (in a given area) to read the external labels and generate or verify the VOLSER is in the library's inventory. The library manager inventory may then be used to direct the accessor 122 to the specific storage shelf having the desired data storage cartridge without moving the vision system to scan the external label. Scratch cartridges which are new to the library may be scanned by the vision system as they are accessed and the volume identity entered into the inventory.

DASD cache 107 provides a cache for data stored in tape library 120. In one embodiment the DASD cache 107 includes a tape volume cache. DASD cache 107 maintains logical volumes as logical volume files that are concatenated into physical volume files in the data storage cartridges loaded in the tape drives located within tape library 120. When a logical volume file in DASD cache 107 moves to a tape drive in a tape library 120, the logical volume file is written to a physical volume file on a data storage cartridge in the actual tape drive. When a physical volume file is recalled for a tape drive and moved to DASD cache 107, the physical volume file then becomes a logical volume file in the DASD cache 107. In this way, DASD cache 107 provides a window to host system 102 of all the physical volume files in tape library 120.

Virtual tape data storage system includes a virtualization node 103 consisting of a plurality of virtual tape daemons, generally designated as tape daemons 105A, 105B, . . . 105N, that represent and emulate virtual tape devices to host system 102. Host system's 102 operating system, in turn, manages the presentation of the virtual tape devices to the systems users (not shown). Host system 102 views the virtual tape devices as actual drives and when host system 102 attempts to access a logical volume in a selected virtual tape device, the respective virtual tape daemon associated with the virtual tape device requested by the host system 102 will handle the host access request.

Host-to-DASD cache data transfer in the illustrated virtual tape data storage subsystem may be controlled by VTS code via a cluster manager process 109 within the hierarchical storage node (HSN). For example, a cluster manager 109 within virtual storage system 100 intercepts and processes the access request from the virtual tape daemons 105A, 105B, . . . 105N. Cluster manager 109 then carries out host system's 102 request to access the logical volume file on DASD cache 107. In one embodiment, host-to-DASD cache data transfer is directly controlled by a file system manager (FSM) 106A, 106B, . . . 106N which handles DASD read and write commands.

Similarly, an interface between the DASD cache 107 and the tape storage drive 121 may be controlled by removable media manager (RMM) 118. For example, if cluster manager 109 attempts to mount a logical volume file that is not located in DASD cache 107, cluster manager 109 will communicate the access request to the recall manager 114, which in turn will forward the request to data mover 111. If the tape in the access request is already mounted in a tape drive 121 in tape library 120, RMM 118 will immediately inform data mover 111 to access the physical volume for the requested logical volume file from the mounted tape. However, if the requested file on a tape is not presently mounted in a tape drive, RMM 118 will initiate a request to library manager 119 to mount the tape containing the physical volume corresponding to the requested logical volume file.

In one embodiment, data mover 111 may copy entire logical volume files from DASD cache 107 to tape library 120. When the available space in DASD cache 107 reaches a predetermined level or after a predetermined time period, cache manager 113 will direct data mover 111 to migrate logical volume files from DASD cache 107 to tape library 120 for archival therein. Cache manager 113 may group the logical volumes into a chain (called a pre-migration chain) and send the job request to data mover 111. As data mover completes a pre-migration chain, another one is issued by cache manager 113 until all data that should be copied to data storage cartridges have completed. Physical tape manager 112 also plays a role in this process by ensuring there are scratch cartridges in the various pools for data mover 111 to use.

Further, RMM 118 may diagnose errors or determine the origin of errors that are detected (e.g. the tape drive 121 or data storage cartridge 123). RMM records the errors into an error event table in the database 116. Based on the history of errors in the database 116, RMM 118 may take appropriate action to create an error recovery procedure (ERP). If an ERP requires operator assistance, an operator intervention may be posted to the management interface 117. The management interface 117 provides information about the system and allows user control and configuration of the system.

Errors relating to the automated physical library 120, drives 121A-121N, and cartridges 123A-123N are often not easily detected and diagnosed correctly. RMM 118 can make use of library SCSI information, drive SCSI information, and the history of errors recorded in the database 116 to greatly assist in isolating the root cause and take the appropriate ERP. RMM 118 can also implement checks and assurances in its mainline responsibilities such as moving a cartridge from one location to another. The most critical RMM 118 function is mounting a cartridge for reading existing data, writing new data, or erasing expired data (data no longer needed by the VTS subsystem). Although there are steps the library manager 119 and the physical library controller (such as the IBM® TS3500 SCSI Medium Changer) 120 take to ensure the correct cartridge 123 was moved from its current location to the requested drive 121, the VTS subsystem 100 manages the data content of the cartridge and must perform the final verification that the correct cartridge has been mounted. RMM 118 plays that important role of ensuring the correct cartridge has been mounted for data mover 111 to perform the critical tape input and output operations.

Figure 2:
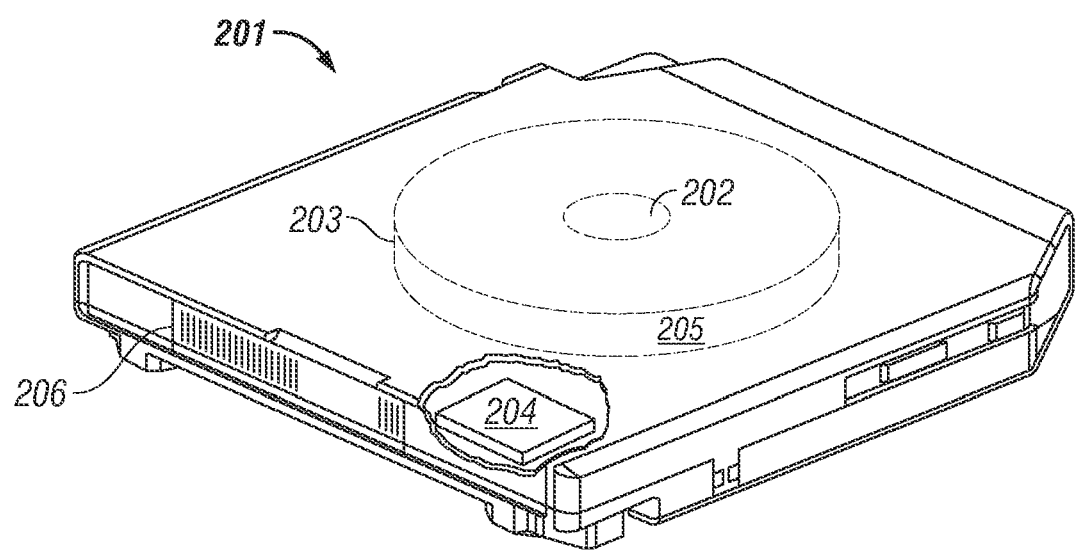
FIG. 2 illustrates a data storage cartridge with a cartridge memory and a data storage tape media.

Referring to FIGS. 1 and 2, a data storage cartridge 201 is illustrated which may include a cartridge memory (CM) 204 (shown in cutaway) and data storage tape media 205, such as a high capacity single reel of magnetic tape (shown in phantom) wound on a hub 202 of a reel 203. If present, the cartridge memory 204 may comprise electrical contacts to allow the tape library 120 and/or tape drive 121 to access the contents of the cartridge memory 204. Alternatively, the cartridge memory 204 may comprise a contactless interface such as induction, radio frequency, or optical. In one embodiment, the cartridge memory 204 comprises an RFID tag. The cartridge memory 204 is used to hold information about the data storage cartridge 201, the tape media 205 in the data storage cartridge 201, and/or the data on the media. The cartridge memory 204 may also be used to store information about the tape drive 121 that accesses the data storage cartridge 201 and/or other devices or applications that may be coupled to the tape drive, such as a library, host computer, operating system, device driver, storage application software, etc. The memory may be read only, write only, read/write, or combinations thereof. For example, portions of the cartridge memory 204 may be read only while other portions are capable of being written or updated. Examples of magnetic data storage cartridges are a cartridge based on LTO (Linear Tape Open) technology, such as the IBM® TotalStorage LTO Ultrium Data Cartridge, and a cartridge based on IBM's 3592 technology, such as the IBM® 3592 Enterprise Data storage cartridge. As will be appreciated, the data storage cartridge 201 may be a magnetic tape cartridge having a dual reel implementation (in which the tape is fed between reels within the cartridge) or single reel implementation, such as illustrated in FIG. 2, in which the tape media 205 is wound on a reel 203 within tape cartridge 201. For example, when the tape cartridge 201 is loaded into a tape drive (e.g. tape drive 121), the tape media 205 is fed between the cartridge reel 203 and a take up reel (not shown) located in the tape drive 121. While exemplary tape cartridges based on the LTO and 3592 formats have been provided, it will be appreciated that the description is not limited by tape format. Examples of other tape formats include DLT, SDLT, 9840, 9940, T10000, AIT, and the like. While this invention is being described as using magnetic tape cartridges, it should be noted that other removable media data cartridges may be used. For example, the tape media 205 may comprise any type of media on which data may be stored and which may serve as removable media, including but not limited to magnetic media (such as magnetic tape or disks), optical media (such as optical tape or disks), electronic media (such as PROM, EEPROM, flash PROM, MRAM, Compactflash™, Smartmedia™, Memory Stick™, etc.), or other suitable media.

All physical cartridges in the library should have an external bar code label 206 that is operator readable and machine readable. The label identifies the volume serial number (herein refer to as the VOLSER or volume identifier) of the cartridge and is used to identify the cartridge to the physical library. All communication with the control program relating to a specific cartridge uses the VOLSER that is read from the external bar code label. The external bar code label also contains 1 or 2 character(s) to identify the cartridge type (media type).

The external label 206 is read by the vision system 125 of FIG. 1 and the label information is supplied to the library manager 119.

Figure 3:
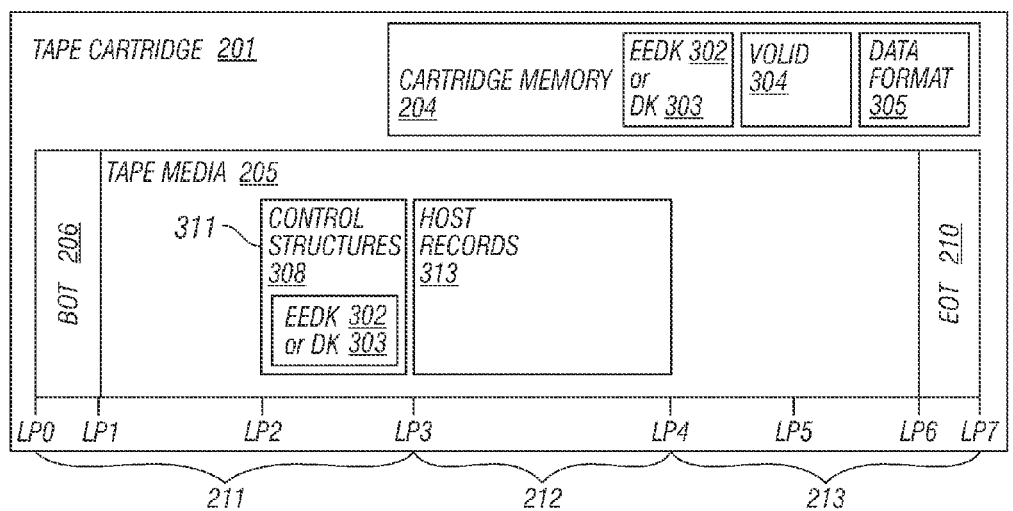
FIG. 3 is a generalized block diagram illustration of the format elements of the data storage tape media in a data storage cartridge.

An example implementation of how various information is stored on a data storage cartridge is illustrated in FIG. 3, which depicts the data storage cartridge 201 having a cartridge memory 204 and a data storage tape media 205 and which shows the format elements of the data storage tape media 205. With reference to an illustrative implementation in which the data storage tape media 205 uses an LTO tape format, the length of a data storage tape media 205 is divided into logical points (LPs), which define bounds of regions of the data storage tape media. The regions of LP0 to LP1 and LP6 to LP7 are unused as they define the physical beginning of tape (BOT) region 206 and the physical end of tape (EOT) region 210, respectively. Additional non-user regions include the region of LP1 to LP2 (which is a servo acquisition area), the region of LP2 to LP3 (which is a calibration area that includes different information in the different bands), and the regions after LP4 (which include the servo acquisition region for reverse wraps). Thus, the data storage tape media 205 layout includes non-user areas 211 and 213. The data storage tape media 205 layout also includes user data regions 212 (between LP3 and LP4) in which data 209, such as encrypted host records is stored. In addition data 209 may comprise non-encrypted data, or a combination of encrypted and non-encrypted data. Of course, different tape formats may be used other than LTO formats.

As shown in FIG. 3, the cartridge memory 204 stores information such as the encryption encapsulated data key (EEDK) 302, data key (DK) 303, VOLID 304, and data format 305 of the host records 309. The EEDK 302 or DK 303 is used by the drive for encrypting and decrypting data on the data storage cartridge 201. The VOLID 304 is an identifier of the cartridge and comprises the VOLSER. In addition to the cartridge memory 204, the non-user regions 211 and 213 can store the same information as the cartridge memory 204 for redundancy and other information such as control structures 308. For example, the EEDK 302 (or DK 303) may be stored in special non-user data set regions between LP2 and LP3. The information stored in the cartridge memory 204 and non-user areas 211 and 213 may be readable by the user of the cartridge such the virtual storage system 100. In particular in one embodiment, the VOLID 304 from the cartridge memory 204 will be used.

Figure 4:
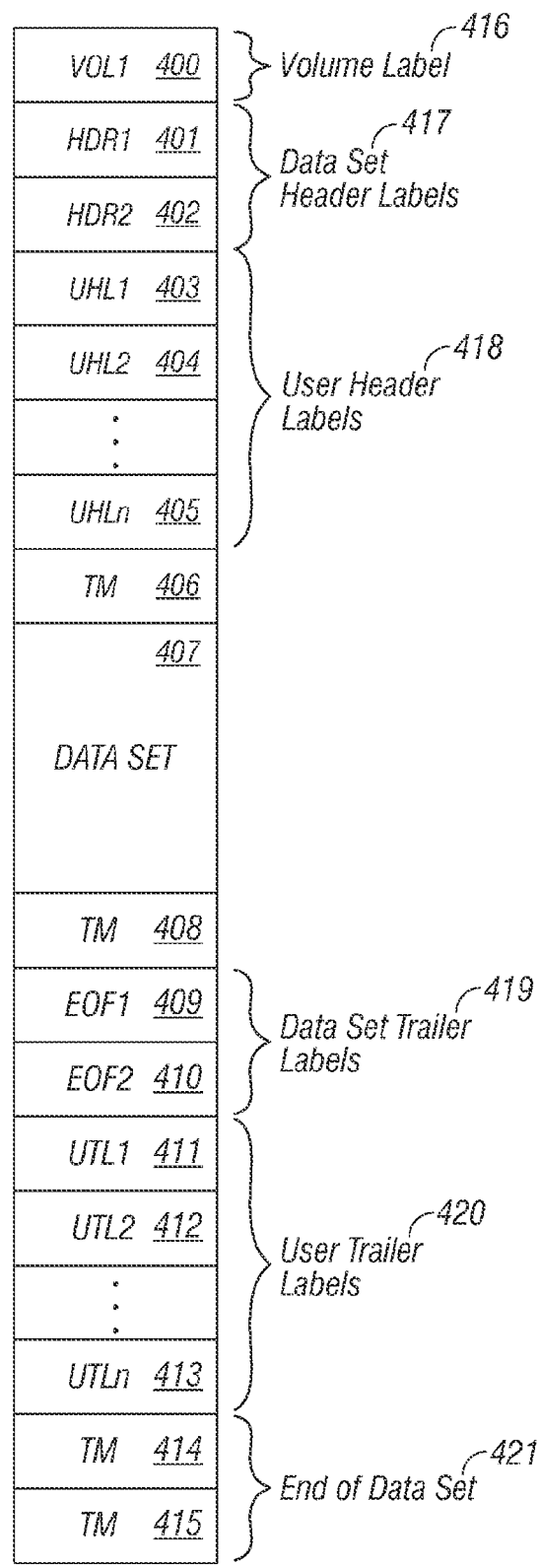
FIG. 4 is a generalized block diagram illustration of an example of a prior art BOT label on a tape cartridge.

FIG. 4 shows the organization of content in a data storage cartridge 201 utilizing standard labels. In this example, the data set 407 is on a single data storage cartridge 201 and is not expanded to another cartridge. However, it should be understood that the present invention is not limited to data sets 407 on a single data storage cartridge 201 and may include data sets that are across multiple data storage cartridges. The label identifier VOL1 400 is known as the volume label 416 and contains the equivalent of the external label. This internally written label is herein referred to as the BOT (Beginning of Tape) label.

The volume label is followed by the data set header labels HDR1 401 and HDR2 402. The content of HDR1 and HDR2 are specific to the user and can contain any user desirable information. In addition the data storage cartridge 201 may include user header labels, UHL1 403, UHL2 404, . . . UHLn. The data set 407 is preceded by a tape mark 406 and followed by a tape mark 408. Tape marks 406 and 408 serve as separators. The data set 407 contains the host data records (e.g. host records 309). The data set trailer labels 419 are identified as EOF1 409 and EOF2 410. The user trailer labels (UTL1 411, UTL2 412, . . . UTLn 413) follow the data set trailer labels 419. Two tape marks (e.g. tape marks 414 and 415) placed consecutively, and without intervening labels, indicate the end of data set 421. In other words, tape marks 414 and 415 indicate that the data set 407 is the last data set on the cartridge and the data set does not continue on another volume of the cartridge. Standard labels are 80-character records and must contain a volume label 416 and data set labels 417 and 419. User labels 418 and 420 are optional.

With reference to FIGS. 3 and 4 the BOT standard volume label 416 appears at the beginning of each data storage cartridge starting at LP3 in FIG. 3. The volume label 416 identifies the cartridge and its owner and is used to verify the correct cartridge is mounted. The volume label 416 comprises 3 parts of interest. Other parts of the volume label 416 will not be described here as they do not contribute to the nature of this invention. The first part contains the characters "VOL" to identify this label as a volume label. The second part consist of the label number "1". The third part are the characters representing the volume serial number (VOLSER) or the external label of the cartridge. For example, if the external label of a physical cartridge is JA1234, the volume label is "VOL1JA1234". The volume label may be recorded in the extended binary-coded-decimal interchange code (EBCDIC) or the American National Standard Code for Information Interchange (ASCII). Since the standard volume label 416 always start with the preceding characters "VOL1", the user can tell what format the volume label 416 was encoded with by comparing "VOL1" with the EBCDIC or ASCSII representation. Once the coding format has been determined, the user can extract the characters following "VOL1" and convert to the desired EBCDIC or ASCSII representation to compare with the external label.

In the context of an embodiment of the present invention, the characters extracted following "VOL1" will be referenced as the "internal label".

The BOT standard volume label 416 provides a method to verify the correct cartridge has been mounted. However, the BOT standard label by itself, restricts the virtual storage system 100 to always perform the label verification from the beginning of tape. The virtual storage system 100 may move data from cache to tape or vice versa by grouping logical volumes into a recall or pre-migration chain and passing the request as a job from one component to another. Rewinding the tape position to perform the label verification and having to reposition to continue tape input or output operations after each job is inefficient.

Figure 5:
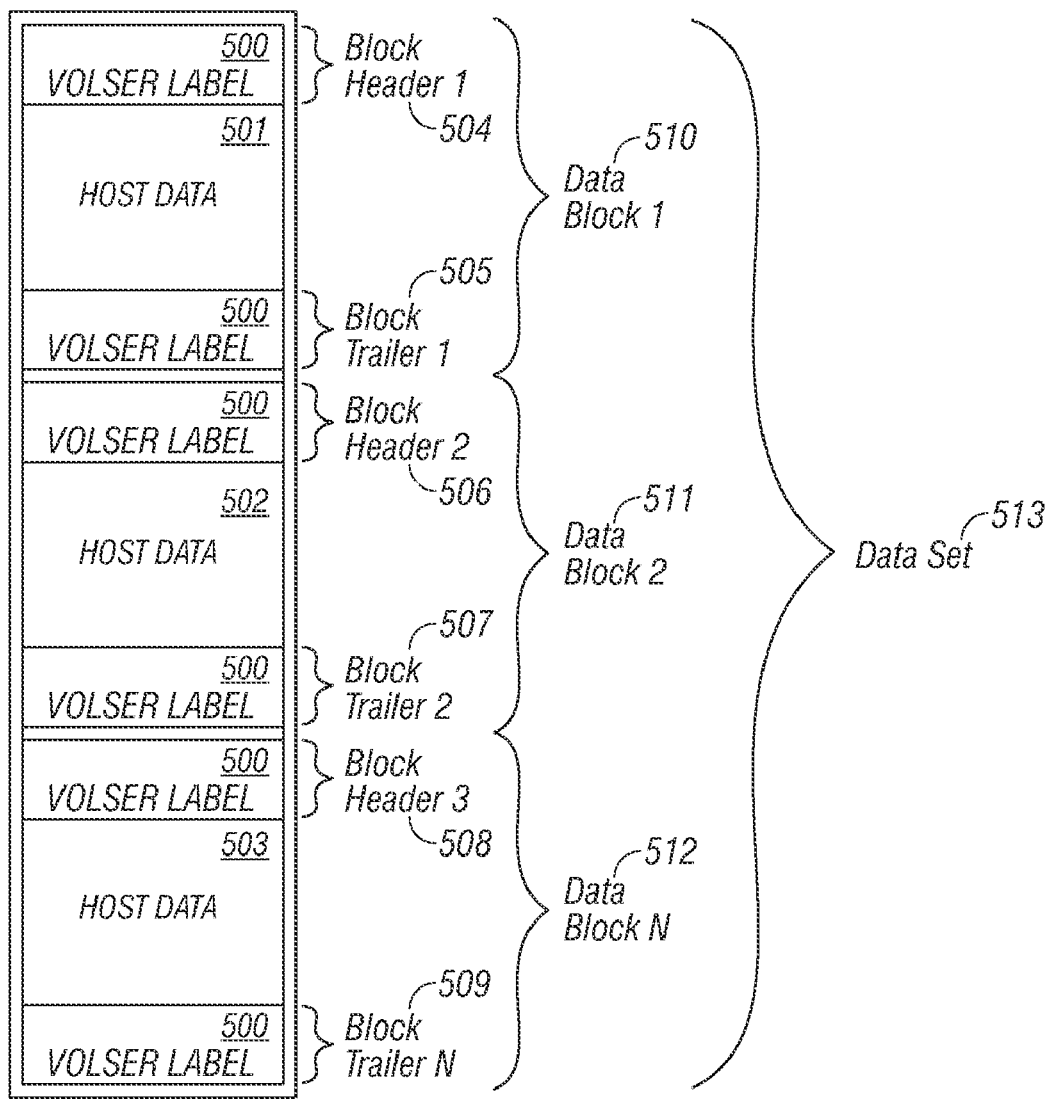
FIG. 5 is a generalized block diagram illustration of an example of a label for a data storage cartridge implemented in accordance with an embodiment of the present invention.

FIG. 5 illustrates an example of the invention that enhances the label verification process. The data set 407 in FIG. 4 is shown as 513 in FIG. 5. Within the data set 513 are the data blocks (510, 511, . . . 512). Each data block (510, 511, . . . 512) has a block header (504, 506, and 508 respectively). Common to each block header (504, 506, . . . 508) is the VOLSER label (internal label) 500. Alternatively, the same VOLSER label 500 can be included in each block trailer (505, 507, . . . 509). In other words, the VOLSER label 500 may be at the beginning, the end, both the beginning and the end, or anywhere in the data block that identifies what tape cartridge is mounted. Having the internal label 500 at each block of the data set 513, the tape position can remain unchanged at the end of each job and the label verification process may be done at the beginning of tape (VOL1 400 FIG. 4) or at any block within the data set 513. This efficient method saves time in the order of minutes for each job request.

Figure 6:
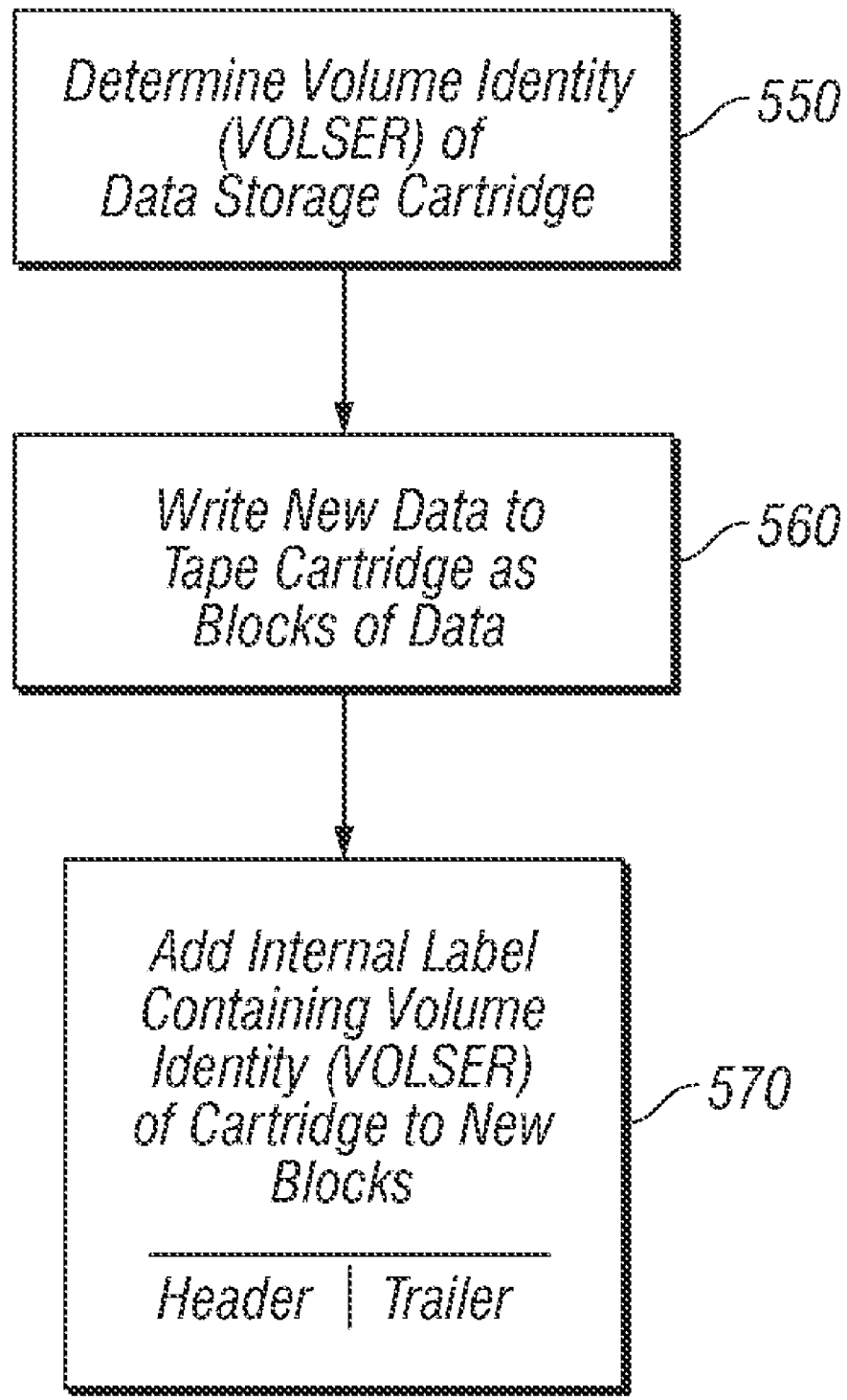
FIG. 6 is a logical flowchart of an embodiment of steps for providing internal labels to a data storage cartridge.

Referring to FIG. 6, the internal labels 500 of FIG. 5 are added in accordance with embodiments of the present invention.

In step 550, the library manager 119 and tape server 101 of FIG. 1 determine the volume identity (VOLSER) of the data storage cartridge 201 of FIG. 2.

As will be explained in more detail, if the data storage cartridge is a scratch cartridge, without any relevant data blocks written, the volume identity may be obtained from the external label 206 of FIG. 2 by the vision system 125 of FIG. 1 and supplied to the library manager 119. Alternatively, the volume identity may be contained in the library manager inventory, as discussed above. This identifies the volume identity (VOLSER) of the physical cartridge. The volume identity for a scratch cartridge may be verified by reading the VOLID of the cartridge memory 204 by a cartridge memory reader 126 and also supplied to the library manager 119.

If the data storage cartridge has previously been written, the volume identity may be obtained from the external label 206 of FIG. 2 by the vision system 125 of FIG. 1 and supplied to the library manager 119 or may be determined from the library manager inventory. The volume identity may be verified by the data storage (tape) drive reading an internal label 500 of FIG. 5 from the data storage tape media. Alternatively, if the tape media is rewound to the beginning of tape, the volume identity may be verified by the tape drive reading the BOT label.

In step 560, in the course of processing a data storage cartridge, new data may be written to the tape cartridge as blocks of data.

In step 570, an internal label 500 of FIG. 5, containing the volume identity (VOLSER) of the data storage cartridge is written with the blocks of data, such that an internal label is provided at each block of data to be written to the data storage tape media of the data storage cartridge. The internal label may, in one embodiment, be provided by the tape server 101 of FIG. 1 to cause the data storage (tape) drive 121 having the cartridge to write the header with the internal label to each block. As discussed above, the internal label 500 of FIG. 5 may be written to the block header, alternatively to the block trailer, or alternatively to both.

Figure 7A:
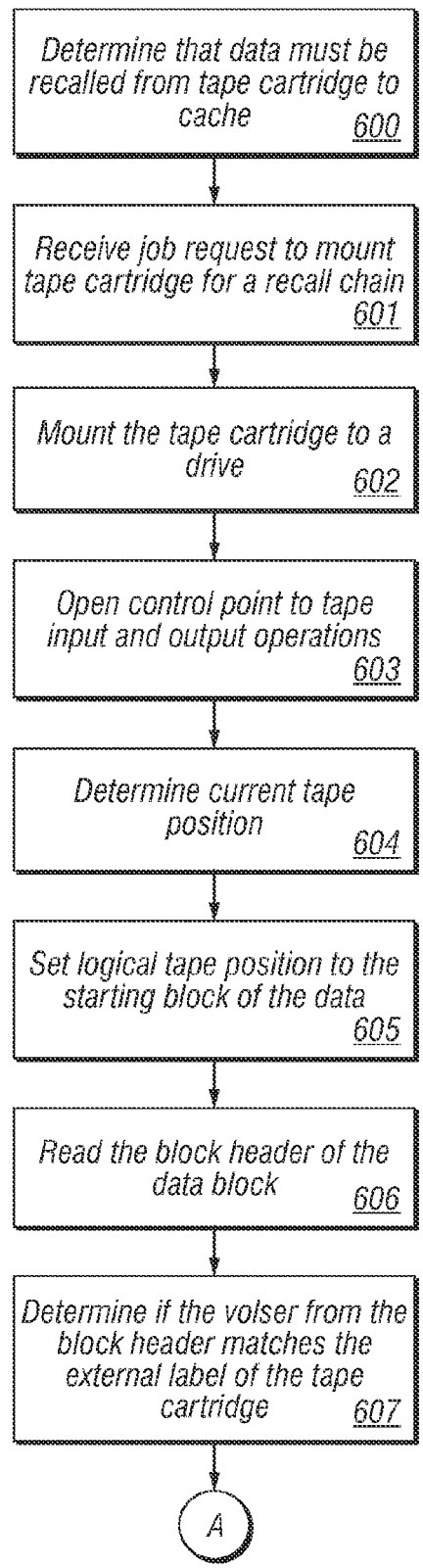
FIG. 7A-7B is a logical flowchart of an embodiment of steps used to verify the correct data storage cartridge has been mounted.
Figure 7B:
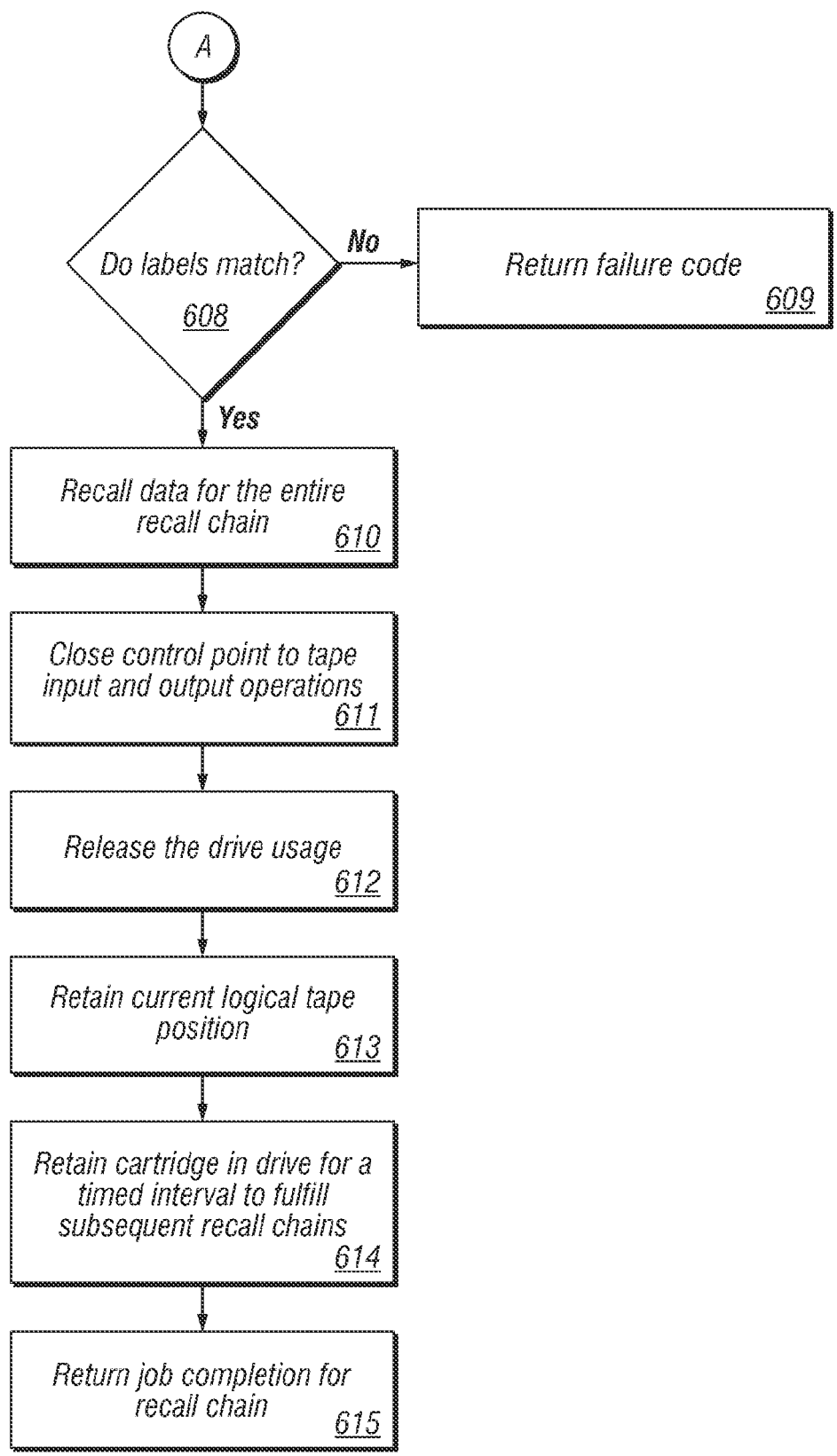

The flow chart in FIG. 7A-7B presents the high level steps involved for multiple recall chains implementing embodiments of the present invention. Referring to FIGS. 1 and 7A, recall manager 114 determines that host data is not in DASD cache 107 and recall chains must be issued to data mover 111 of FIG. 1 to get the data from tape cartridges 121A-121N, as shown in step 600. Recall manager groups the logical volumes in each recall chain such that all the logical volumes exist on the same tape cartridge (not shown). Data mover 111 receives the first recall chain with a list of logical volumes to recall to DASD cache 107, determines the tape cartridge to be mounted, and issues the mount request to RMM 118, as shown in step 601. In step 602, RMM 118 chooses a drive 121A-121N, mounts the tape cartridge via library manager 119 (this step is skipped if the cartridge is already mounted in a drive and the drive is not in used), and returns control back to data mover 111. Data mover 111 opens the control point to tape input and output operations in step 603. Datamover 111 queries the drive for the current tape position in step 604 and determines the closest block to check the internal label (not shown). In this example of step 605, data mover 111 sets the tape position to the starting block of the first logical volume data. In step 606, data mover 111 reads the content of the data block and extracts the internal label 500 of FIG. 5 from the block header (step 607).

Referring to FIGS. 1 and 7B, in step 608, data mover 111 compares the internal label with the external label. If the internal label 500 of FIG. 5 does not match the external label, step 609 returns an error code to recall manager 114. If the internal label and external label match, data mover 111 recalls all the logical volumes in the recall chain in step 610. After the recall chain has completed, data mover closes the control point to tape input and output operations in step 611. Data mover 111 informs RMM 118 the drive is no longer needed in step 612. In step 113, RMM 118 retains the current tape position where data mover 111 last left it. RMM 118 also leaves the cartridge in the drive for a timed interval before dismounting the cartridge (unloading the cartridge from the drive and putting the cartridge to its home location), as shown in step 614. In step 615, RMM 118 returns control back to datamover 111, and data mover 111 returns job completion to recall manager 114. Recall manager 114 issues the next recall chain to data mover 111, and the process starts from step 600 again. As shown in this example, the components within the virtual storage system 100 cooperate to provide efficiency in the label verification process and reduce unnecessary accessor or tape position movements.

Figure 8A:
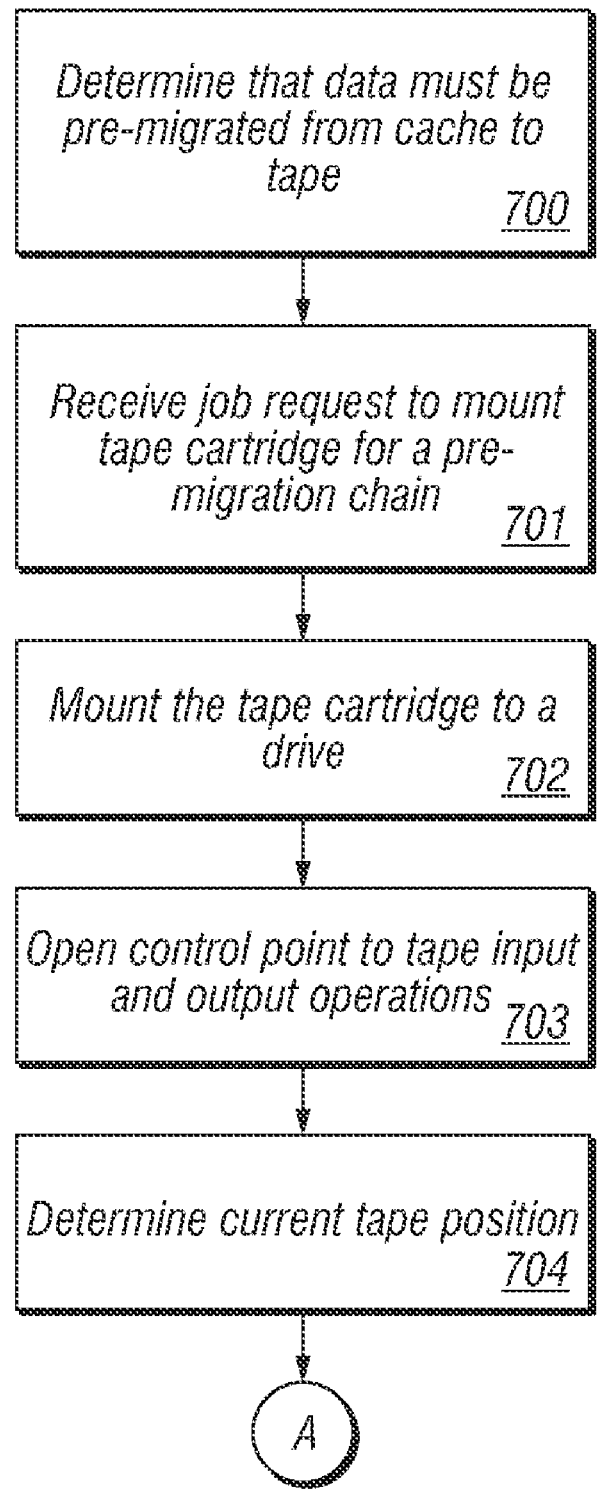
FIG. 8A-8B is a logical flowchart of the steps used to verify the correct data storage cartridge has been mounted for multiple pre-migration chains.
Figure 8A:
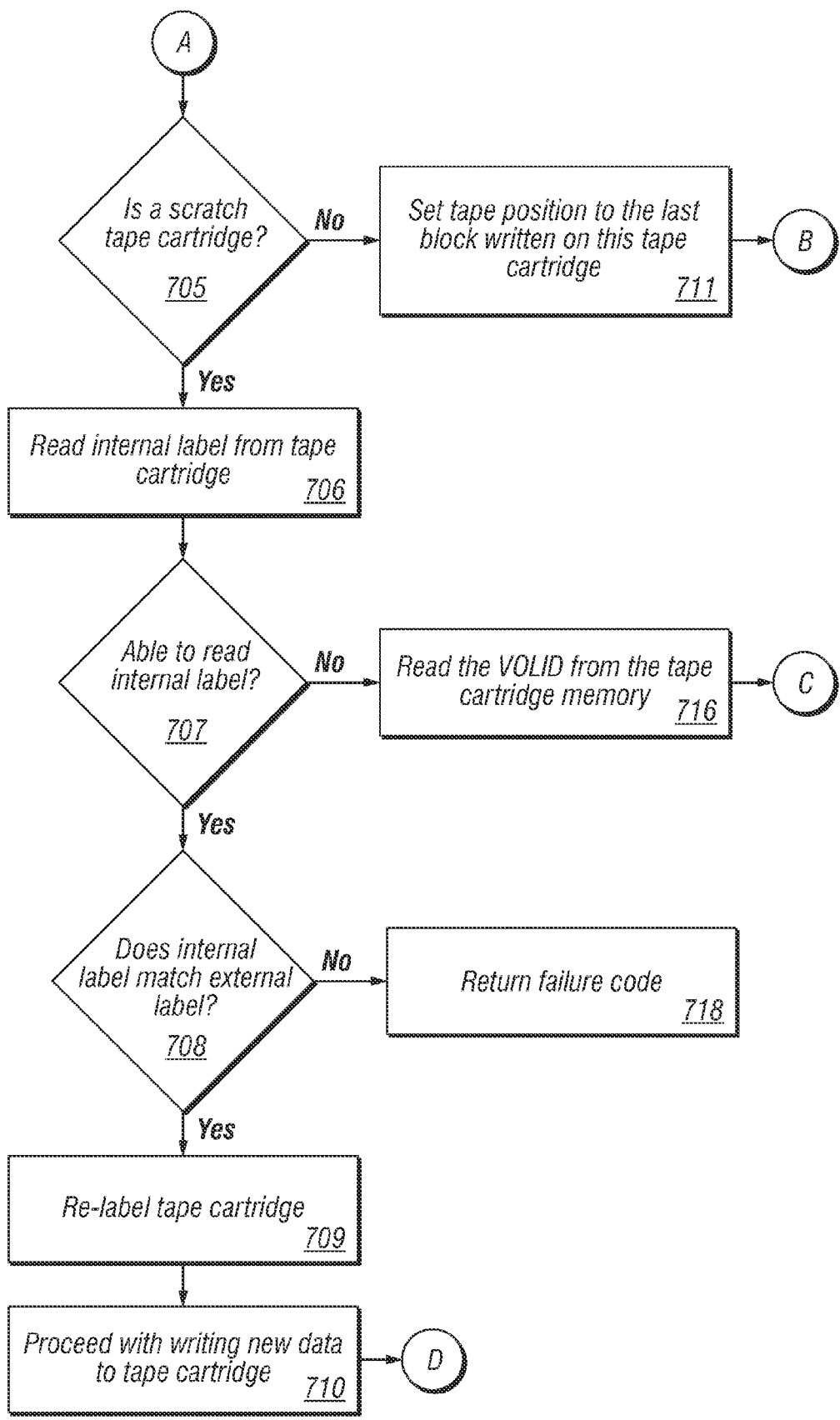
Figure 8A:
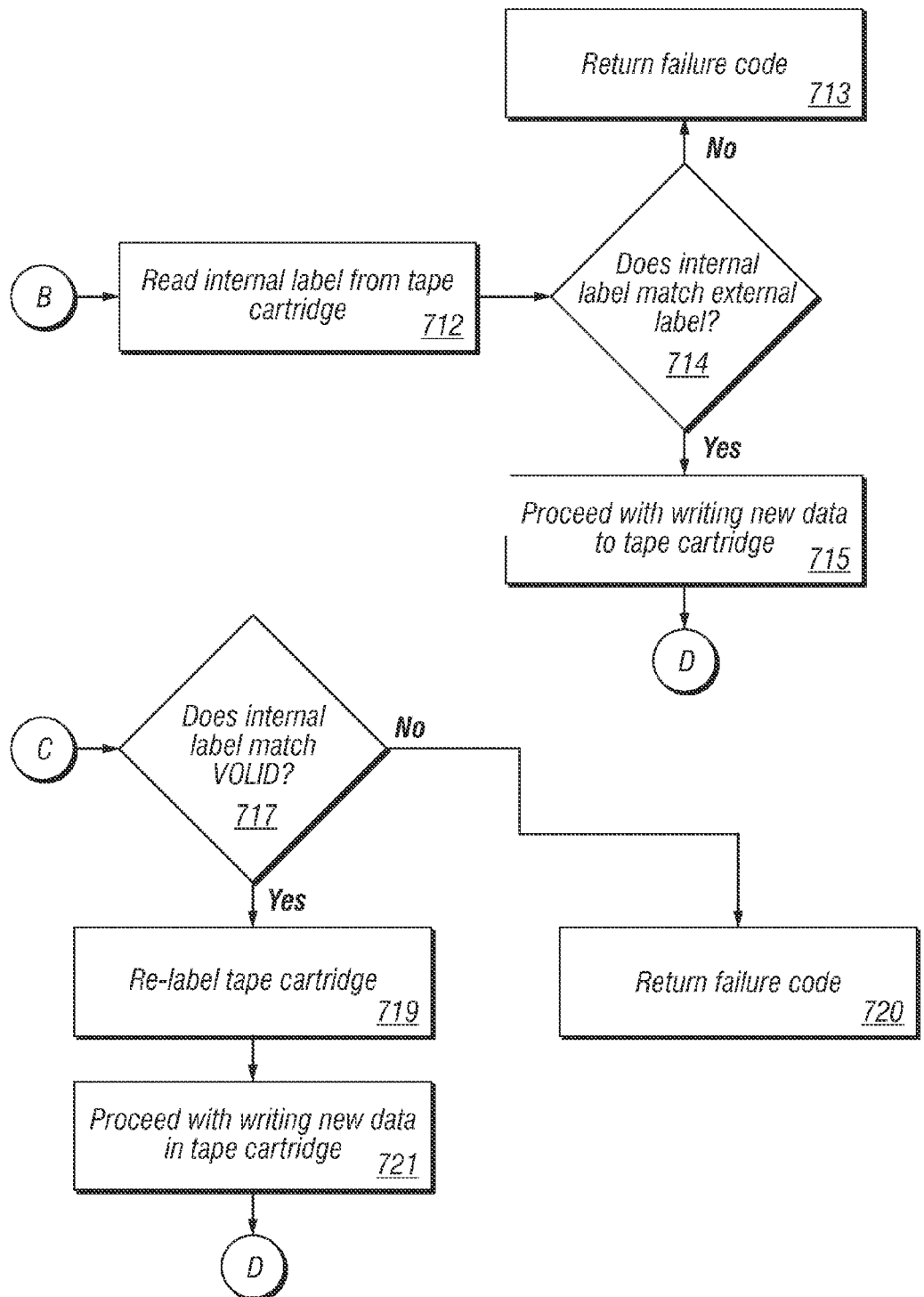
Figure 8B:
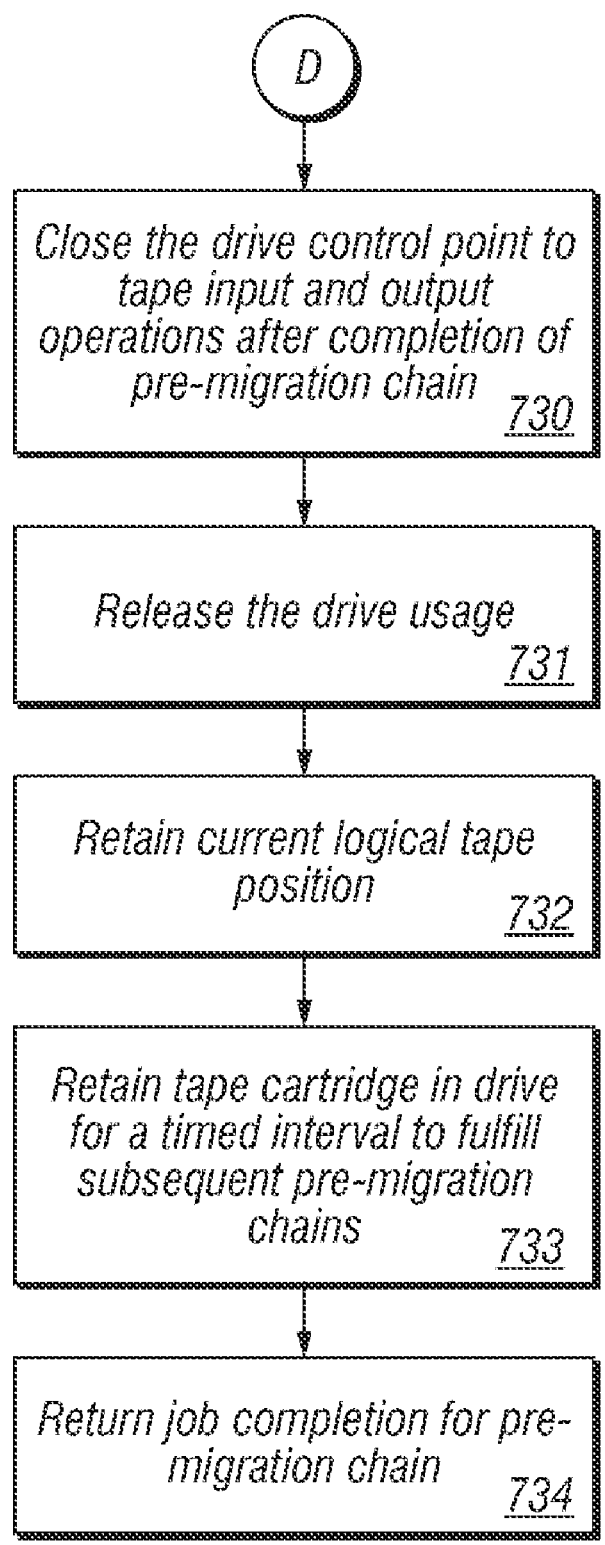

FIGS. 8A-8B further illustrates the usage of the invention with a flow chart showing the steps involved in multiple pre-migration chains. Referring to FIGS. 1, 8A and 8B, the process begins with cache manager 113 determining that data from DASD cache 107 must be copied to tape cartridges 121A-121N, as shown in step 700. Cache manager 113 groups the logical volumes into one or more pre-migration chains and issues the first chain to data mover 111 (not shown). RMM 118 receives the mount request from data mover 111 in step 701. In step 702, RMM 118 chooses a drive 121A-121N, mounts the tape cartridge via library manager 119 (this step is skipped if the cartridge is already mounted in a drive and the drive is not in used), and returns control back to data mover 111. Data mover 111 opens the control point to tape input and output operations in step 703. In step 704, Datamover 111 queries the drive for the current tape position and stores it in memory. Data mover 111 decides, in step 705, whether the tape cartridge is a scratch cartridge or not by querying the database 116. If the cartridge is a scratch cartridge (the tape position is likely at the beginning of tape, otherwise data mover will rewind the tape position to the beginning of tape), data mover 111 will attempt to read the internal label from beginning of tape, as shown in step 706. If the read in step 707 results in a failure (i.e., drive 121 is a 3592 J1A drive and the cartridge was once written in a higher level data format by a 3592 E05 drive), data mover 111 will read the VOLID from the tape cartridge memory in step 716. In step 717, data mover 111 determines if the VOLID matches the external label of the tape cartridge. If the VOLID does not match the external label, data mover will not use the tape cartridge and returns a failure code to cache manager 113, as shown in step 720. Otherwise, if the VOLID and external label match, data mover re-labels the tape cartridge in step 719. Re-labeling comprises updating the cartridge memory and perhaps the BOT label.

Once the cartridge has been written at the beginning of tape, the data format is now compatible with the drives 121A-121N in the virtual storage system 100. In step 121, data mover proceeds with writing the pre-migration chain to the tape cartridge. As explained above, each written block of the data contains the internal label described in FIG. 5. After the entire pre-migration chain has been written to the tape cartridge, datamover 111 closes the drive control point in step 730. Data mover 111 informs RMM 118 the drive is no longer needed in step 731. In step 732, RMM 118 retains the current tape position where data mover 111 last left it. RMM 118 also leaves the cartridge in the drive for a timed interval before dismounting the cartridge (unloading the cartridge from the drive and putting the cartridge to its home location), as shown in step 733. In step 734, RMM 118 returns control back to datamover 111, and data mover 111 returns job completion to cache manager 113. Cache manager 113 issues the next pre-migration chain to data mover 111, and the process starts from step 700 again.

Now returning to step 707 where data mover 111 is able to read the internal label from the tape cartridge. In step 708, data mover compares the internal label with the external label. If the internal label does not match the external label, data mover will not use the tape cartridge and returns a failure code to cache manager 113, as shown in stop 718. In step 709, data mover has determined the internal label and external label match, and the tape cartridge is re-labeled from the beginning of tape. In step 710, data mover proceeds with writing the pre-migration chain to the tape cartridge. As explained above, each written block of the data contains the internal label described in FIG. 5. After the entire pre-migration chain has been written to the tape cartridge, datamover 111 closes the drive control point in step 730. Data mover 111 informs RMM 118 the drive is no longer needed in step 731. In step 732, RMM 118 retains the current tape position where data move 111 last left it. RMM 118 also leaves the cartridge in the drive for a timed interval before dismounting the cartridge (unloading the cartridge from the drive and putting the cartridge to its home location), as shown in step 733. In step 734, RMM 118 returns control back to datamover 111, and data mover 111 returns job completion to cache manager 113. Cache manager 113 issues the next pre-migration chain to data mover 111, and the process starts from step 700 again.

Now returning to step 705 where data mover 111 has determined the tape cartridge is not a scratch cartridge, data mover sets the tape position to the last block written in step 711 to perform the label verification. In step 711, data mover may also perform the check at the beginning of tape (VOL1 record of the IBM Standard Label) or at the nearest written data block (depending on the current tape position obtained from step 704). In step 712, data mover reads the content of the data block and extracts the internal label from the block header. In step 714, data mover 111 compares the internal label with the external label. If the internal label does not match the external label, data mover will not use the tape cartridge and returns a failure code to cache manager 113, as shown in stop 713. In step 715, data mover has determined the internal label and external label match and proceeds to writing the pre-migration chain to the tape cartridge. As explained above, each written block of the data contains the internal label described in FIG. 5. After the entire pre-migration chain has been written to the tape cartridge, datamover 111 closes the drive control point in step 730. Data mover 111 informs RMM 118 the drive is no longer needed in step 731. In step 732, RMM 118 retains the current tape position where data mover 111 last left it. RMM 118 also leaves the cartridge in the drive for a timed interval before dismounting the cartridge (unloading the cartridge from the drive and putting the cartridge to its home location), as shown in step 733. In step 734, RMM 118 returns control back to datamover 111, and data mover 111 returns job completion to cache manager 113. Cache manager 113 issues the next pre-migration chain to data mover 111, and the process starts from step 700 again.

As illustrated in the example in FIG. 8A-8B, the invention provides an efficient method for verifying the correct tape cartridge is mounted. The efficiency in the method results in less overhead processing and allows faster continuation in copying data from cache to tape from one job request to the next. Furthermore, the method's flexible use of scratch tape cartridges using the tape cartridge memory as a mechanism for determining the internal label when the internal label cannot be read (due to data format incompatibility) saves customer and IBM support resources delicated to having to investigate and ensure the compatibility of newly inserted scratch cartridges into a physical library.

What is claimed is:

1. A method for providing verification information to be written to a data storage cartridge having data storage tape media, comprising the steps of:
    determining the volume identity of said data storage cartridge;
    providing an internal label at each block of data to be written to said data storage tape media of said data storage cartridge, said internal label at least comprising said volume identity;
    wherein said data storage cartridge comprises a cartridge memory identifying a volume identity, and comprises an external label identifying a volume identity;
    wherein said method additionally comprises the steps of:
        determining whether said data storage cartridge is a scratch cartridge;
        if so, said identity determining step comprises determining whether said volume identity of said external label matches said volume identity of said cartridge memory, and, if so, making said determination that said matching volume identity is said volume identity of said data storage cartridge;
        causing said volume identity to be written at the beginning of tape of said data storage tape media; and
        causing said provided internal label to be written at each block of data to said data storage tape media of said data storage cartridge, said internal label at least comprising said volume identity.

2. The method of claim 1, wherein said providing step comprises providing said internal label at the block header of each said block of data to be written to said data storage tape media of said data storage cartridge.

3. The method of claim 1, wherein said providing step comprises providing said internal label at the block trailer of each said block of data to be written to said data storage tape media of said data storage cartridge.

4. A tape subsystem comprising:
    a tape library comprising:
        a plurality of data storage shelves configured to store data storage cartridges;
        at least one data storage drive configured to read and write with respect to data storage cartridges; and
        at least one accessor configured to access and load data storage cartridges with respect to said data storage shelves and said at least one data storage drive, and having a vision system configured to read an external label of a data storage cartridge, said external label at least comprising a volume identity of said data storage cartridge; and
    tape server and library manager configured to operate said vision system to read said volume identity of said external label of a data storage cartridge, which data storage cartridge is loaded with respect to said at least one data storage drive; to determine the volume identity of said data storage cartridge employing said volume identity of said external label; and configured to provide an internal label at each block of data to be written to said data storage tape media of said data storage cartridge by said at least one data storage drive, said internal label at least comprising said volume identity;
    wherein said data storage cartridge comprises a cartridge memory identifying a volume identity; and
    wherein said tape server and library manager are additionally configured to:
        determine whether said data storage cartridge is a scratch cartridge;
        if so, in determining the volume identity of said data storage cartridge, to determine whether said volume identity of said external label matches said volume identity of said cartridge memory, and, if so, make said determination that said matching volume identity is said volume identity of said data storage cartridge;
        cause said at least one data storage drive to write said volume identity at a beginning of tape of said data storage tape media; and
        cause said at least one data storage drive to write said provided internal label at each block of data to said data storage tape media of said data storage cartridge, said internal label at least comprising said volume identity.

5. The tape subsystem of claim 4, wherein said tape server and library manager are configured to provide said internal label at the block header of each said block of data to be written to said data storage tape media of said data storage cartridge.

6. The tape subsystem of claim 4, wherein said tape server and library manager are configured to provide said internal label at the block trailer of each said block of data to be written to said data storage tape media of said data storage cartridge.

* * * * *